United States Patent [19]
DeLuca et al.

[11] Patent Number: 5,630,152
[45] Date of Patent: May 13, 1997

[54] COMMUNICATION PROTOCOL BETWEEN MASTER AND SLAVE DEVICE WITH REGISTER INFORMATION SHARING

[75] Inventors: Joan S. DeLuca; Barry W. Herold, both of Boca Raton, Fla.

[73] Assignee: Motorola, Inc., Schaumburg, Ill.

[21] Appl. No.: 317,107

[22] Filed: Oct. 3, 1994

Related U.S. Application Data

[63] Continuation of Ser. No. 884,689, May 18, 1992, abandoned.

[51] Int. Cl.$^6$ .................................................. H03K 3/3562
[52] U.S. Cl. ........................................................ 395/800
[58] Field of Search ................................. 395/275, 825; 370/24, 50, 85.12, 60, 118; 210/219; 340/825.44, 825.5; 379/58, 93

[56] References Cited

U.S. PATENT DOCUMENTS

| | | | |
|---|---|---|---|
| 4,494,194 | 1/1985 | Harris et al. | 395/275 |
| 4,587,651 | 5/1986 | Nelson et al. | 370/85.12 |
| 4,675,863 | 6/1987 | Paneth et al. | 370/50 |
| 4,739,323 | 4/1988 | Miesterfeld et al. | 340/825.5 |
| 4,739,324 | 4/1988 | Miesterfeld et al. | 340/825.5 |
| 4,742,349 | 5/1988 | Miesterfeld et al. | 340/825.5 |
| 4,748,656 | 5/1988 | Gibbs et al. | 379/93 |
| 4,763,323 | 8/1988 | Nelson et al. | 370/85.6 |
| 4,779,093 | 10/1988 | Watkins | 340/825.57 |
| 4,803,481 | 2/1989 | Mueller et al. | 340/825.5 |
| 4,816,996 | 3/1989 | Hill et al. | 395/825 |
| 4,823,312 | 4/1989 | Michael et al. | 395/250 |
| 4,829,554 | 5/1989 | Barnes et al. | 379/58 |
| 4,831,358 | 5/1989 | Ferrio et al. | 340/825.5 |
| 4,862,456 | 8/1989 | Giorgio | 370/118 |
| 4,868,560 | 9/1989 | Oliwa et al. | 340/825.44 |
| 4,876,710 | 10/1989 | Reed et al. | 395/63 |
| 4,940,963 | 7/1990 | Gutman et al. | 210/219 |
| 4,958,277 | 9/1990 | Hill et al. | 395/325 |
| 5,274,797 | 12/1993 | Barlow et al. | 395/575 |
| 5,303,227 | 4/1994 | Herold et al. | 370/24 |
| 5,345,564 | 9/1994 | Jensen et al. | 395/275 |

Primary Examiner—Kevin J. Teska
Assistant Examiner—Dan Fiul
Attorney, Agent, or Firm—Kelly A. Gardner

[57] ABSTRACT

A method for full duplex communication between master and slave devices (403, 422) coupled by a serial peripheral interface (420) includes the steps of the slave device (422) updating a status register (421) based upon an event, after which the slave device (422) transmits a communication request to the master device (403). When the master device (403) thereafter takes the slave-select line low to initiate communication, the slave device (422) automatically transmits the contents of the status register (421) over the master-in-slave-out line. At the same time, the master device (403) transmits an "empty" byte of information over the master-out-slave-in line.

17 Claims, 4 Drawing Sheets

5,630,152

COMMUNICATION PROTOCOL BETWEEN MASTER AND SLAVE DEVICE WITH REGISTER INFORMATION SHARING

This is a continuation of application Ser. No. 07/884,689, filed May 18, 1992 now abandoned.

FIELD OF THE INVENTION

This invention relates in general to communication between semiconductor devices, and more specifically to a method and apparatus for full duplex communication between a master device and a slave device

BACKGROUND OF THE INVENTION

Electronic devices, such as pagers, often incorporate communication between different semiconductor devices. In many electronic devices, the communication between semiconductor components involves data transference between a master device, e.g., a microprocessor, and a slave device, e.g., a support chip.

In conventional pagers, the slave device is capable of generating an external signal received by the master device which can cause an interrupt. Because the interrupt can be generated by many sources, rapid determination of a highest priority interrupt must be made by the master device. Under some circumstances, the determination of the highest priority interrupt may not be rapid enough to meet the needs of a system. Such a circumstance could arise, for example, when the slave device in a pager detects that a battery providing primary power has been removed from the pager, i.e., when the interrupt source is a "gone cell" interrupt. Subsequent to receiving the interrupt and ending communication, the master device normally shuts down the sections of the pager that draw high current, e.g., the receiver circuitry, and switches the power from the main battery to a backup battery. If too much time passes before the power is switched to the backup battery, the supply voltage could become low enough so that the memory of the pager is lost. This critical event would result in the loss of any messages that have been received by the pager.

Thus, what is needed is a more rapid method of data transference between the slave device and the master device.

SUMMARY OF THE INVENTION

According to a first aspect of this invention, a method for data transference between a master device and a slave device comprises the steps of the master device providing a communication initiation signal to the slave device, the master device providing a signal to the slave device, the slave device, substantially coincident with the master device providing the signal, providing an information signal to the master device.

According to a second aspect of this invention, an electronic device having full duplex data transference between semiconductor devices, comprises a master device and a slave device. The slave device comprises registers for storing information and a controller for receiving information signals and updating the information in response to the information signals. The master device is coupled to the slave device by an interface in such a manner that provides for full duplex communication between the master device and the slave device. The interface comprises a first line for providing a communication initiation signal to the slave device from the master device. Thereafter, a second line provides the updated information to the master device from the slave device simultaneously with a third line providing a signal to the slave device from the master device.

DESCRIPTION OF THE PREFERRED EMBODIMENT

Figure 1:
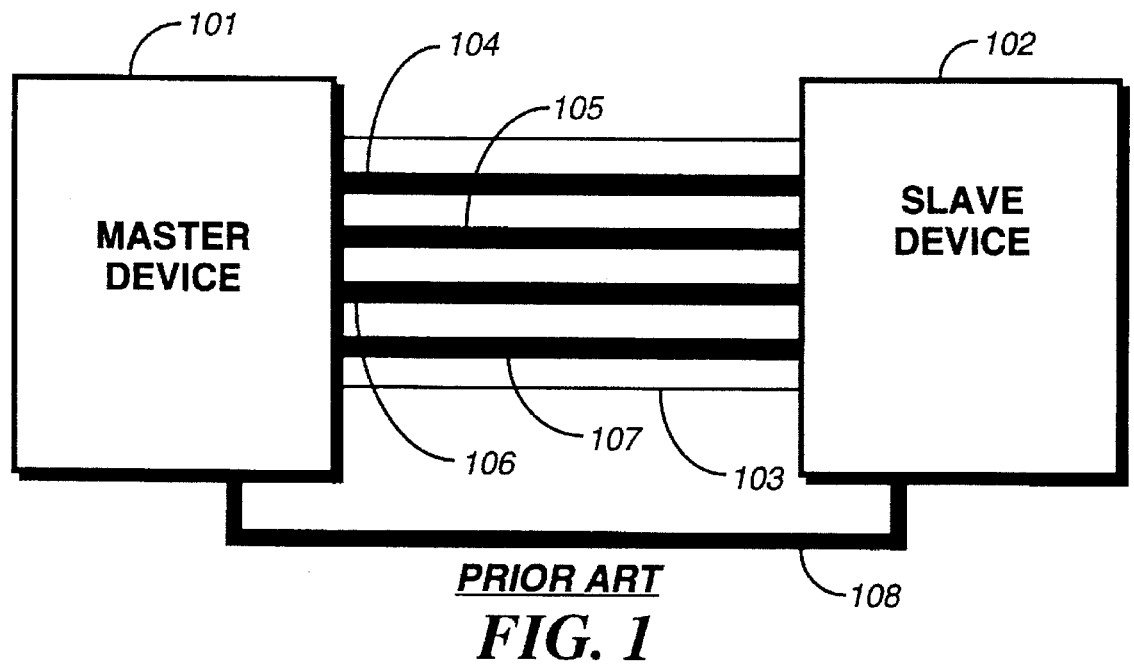
FIG. 1 is a diagram of a conventional communication interface between a master semiconductor device and a slave semiconductor device.

A conventional interface between a master device and a slave device in an electronic device, such as a pager, is illustrated in FIG. 1. The master device 101 is coupled to the slave device 102 via a serial peripheral interface (SPI) 103 for data transference. The SPI 103 comprises four lines connected between the master device 101 and the slave device 102. The four lines include a slave select line (SS) 104 controlled by the master device 101 to initiate communication with the slave device 102, a master out slave in (MOSI) line 105 for transferring data from the master device 101 to the slave device 102, a master in slave out (MISO) line 106 for transferring data from the slave device 102 to the master device 101, and a serial clock line (SCK) 107 which is active during address and data transfers. The serial clock is used to synchronize the movement of data both into and out of the master device on the MISO line 106 and the MOSI line 105. Four possible timing relationships between the SCK line 107 and the transferred data. The timing relationship is controlled by bits located in a serial peripheral control register (SPCR) internal to the master device 101.

In conventional pagers, the slave device 102 generates an interrupt signal received by the master device 101 which causes an interrupt. The interrupt signal is generated by the slave device 102 in response to an interrupt event. Interrupt events are, by way of example, a battery voltage that has fallen below a predetermined level or a modulo timer which signals a timeout to the slave device 102. When an interrupt event occurs, the slave device 102 pulls an interrupt line 108, coupled to the master device 101, low.

Figure 2:
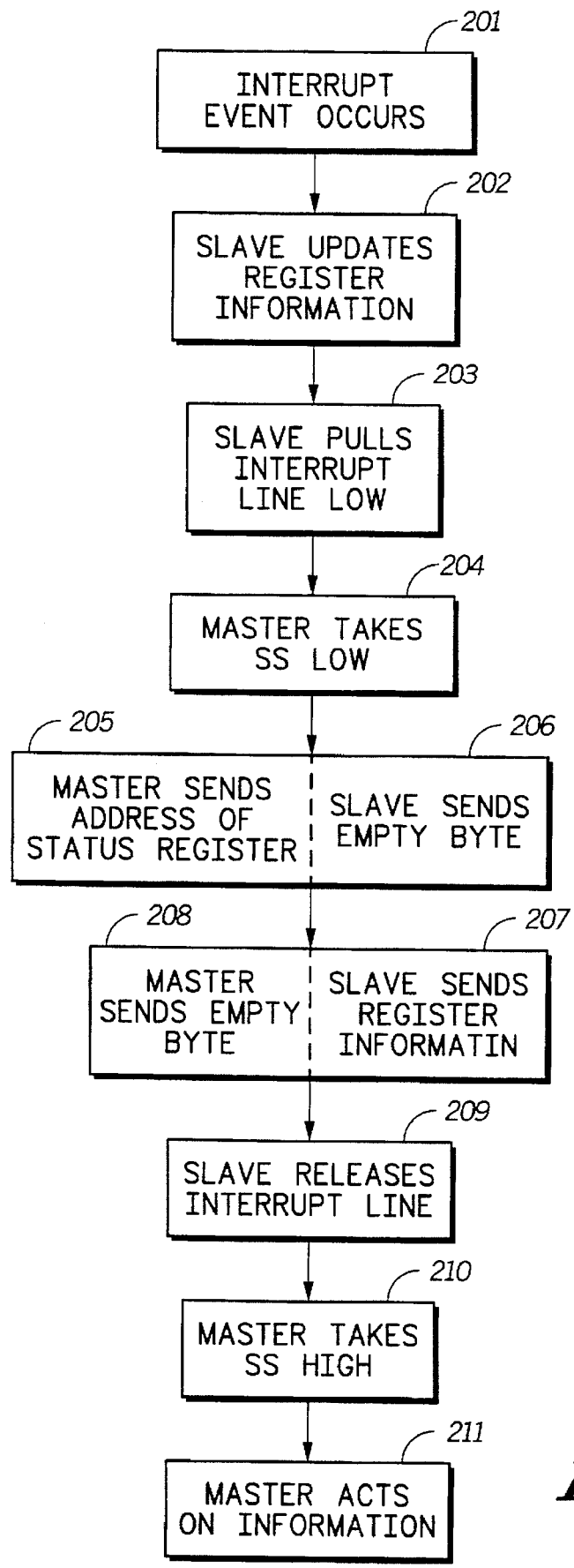
FIG. 2 is a flowchart illustrating a conventional method of data transference between the semiconductor devices of FIG. 1.

FIG. 2 is a flowchart illustrating a conventional method of full duplex data transference between the master device 101 and the slave device 102. Full duplex data transference can occur in such a manner that the falling edge of every clock cycle of the SCK line 107 causes a bit to be transferred simultaneously from the master device 101 on the MOSI line 105 and from the slave device 102 on the MISO line 106. When an interrupt event occurs 201, the slave device 102 updates 202 internal register information and pulls the interrupt line 108 (FIG. 1) low 203 to inform the master device 101 that data is ready to be transferred. The master device 101 initiates communication by taking the SS line 104 low 204. The master device 101 then sends 205 a request for information, i.e., a byte containing the address of an interrupt status register contained in the slave device 102. Simultaneously, in accordance with the full duplex communication mode, the slave device 102 sends 206 an wasted byte, which contains no useful information, over the MISO line 106. Subsequent to receiving the address of the interrupt status register from the master device 101, the slave device 102 sends 207 the information contained in the interrupt status register, while the master device 101 simultaneously sends 208 a wasted byte over the MOSI line 105. The slave device 102 then takes 209 the interrupt line 108 high. Thereupon, the master device 101 may take 210 the SS line 104 high, ending communication with the slave device 102. The master device 101 thereafter proceeds to act 211 upon the data received. For example, if a modulo timer times out, creating an interrupt, the master device 101 resets the timer in response to the data that has been transferred from the slave device 102 to the master device 101. Thus, the full duplex communication mode, while providing more rapid intercommunication between the slave device 102 and the master device 101, regrettably requires the transference of useless wasted bytes 206 and 208 in conventional interrupt communication.

Figure 3:
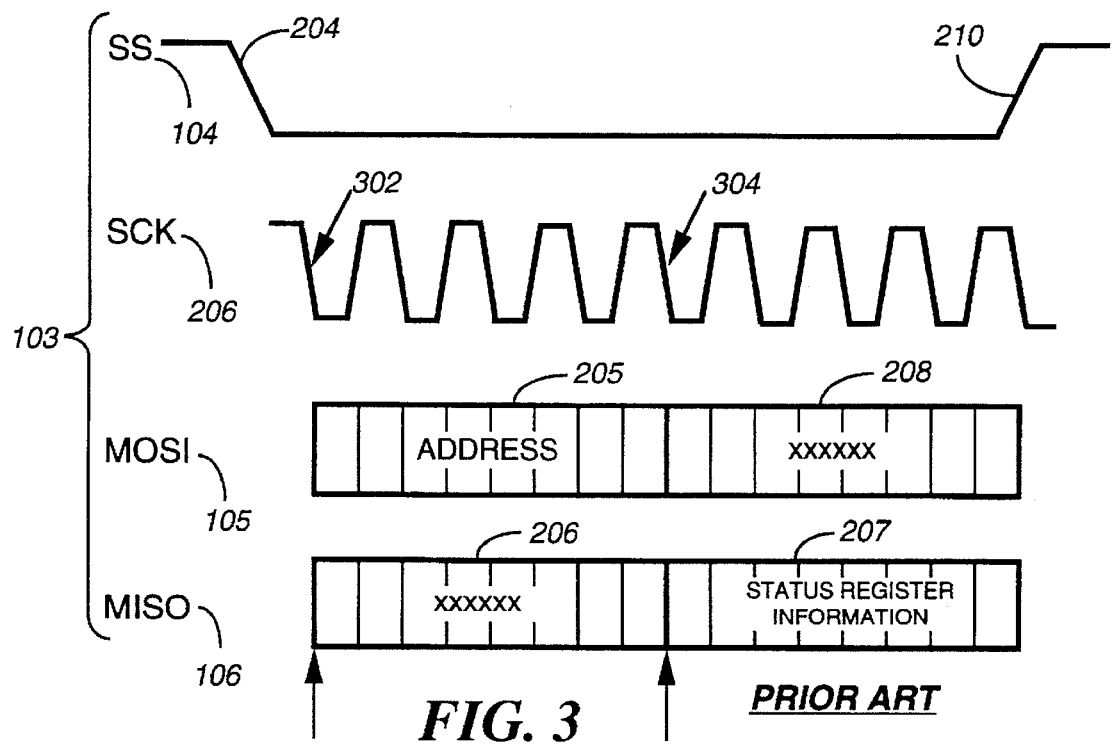
FIG. 3 is a timing diagram for the conventional method of data transference of FIG. 2.

The conventional interrupt communication process is also depicted in FIG. 3, wherein a timing diagram illustrates full duplex data transference via the SPI 103. Subsequent to the master device 101 taking the SS line 104 low 204, the SCK line 107 clock begins to cycle. At the first falling edge 302 of the clock cycle, the master device 101 may send 205 the request for information, i.e., the address of the interrupt status register, on the MOSI line 105. Because the slave device 102 has not yet received the request from the master device 101, the slave device 102 sends 206 a wasted byte on the MISO line 106. This data is cleared on the eighth falling edge 304 of the SCK line 107 clock cycle, and another full duplex data transfer is begun, wherein the master device 101 sends 208 an empty byte on the MOSI line 105 while the slave device 102 sends 207 the information contained in the addressed interrupt status register on the MISO line 106. Thereafter, the slave device 102 takes 209 the interrupt line 108 high, and the master device 101 may take 210 the SS line 104 high, ending communication with the slave device 102.

Figure 4:
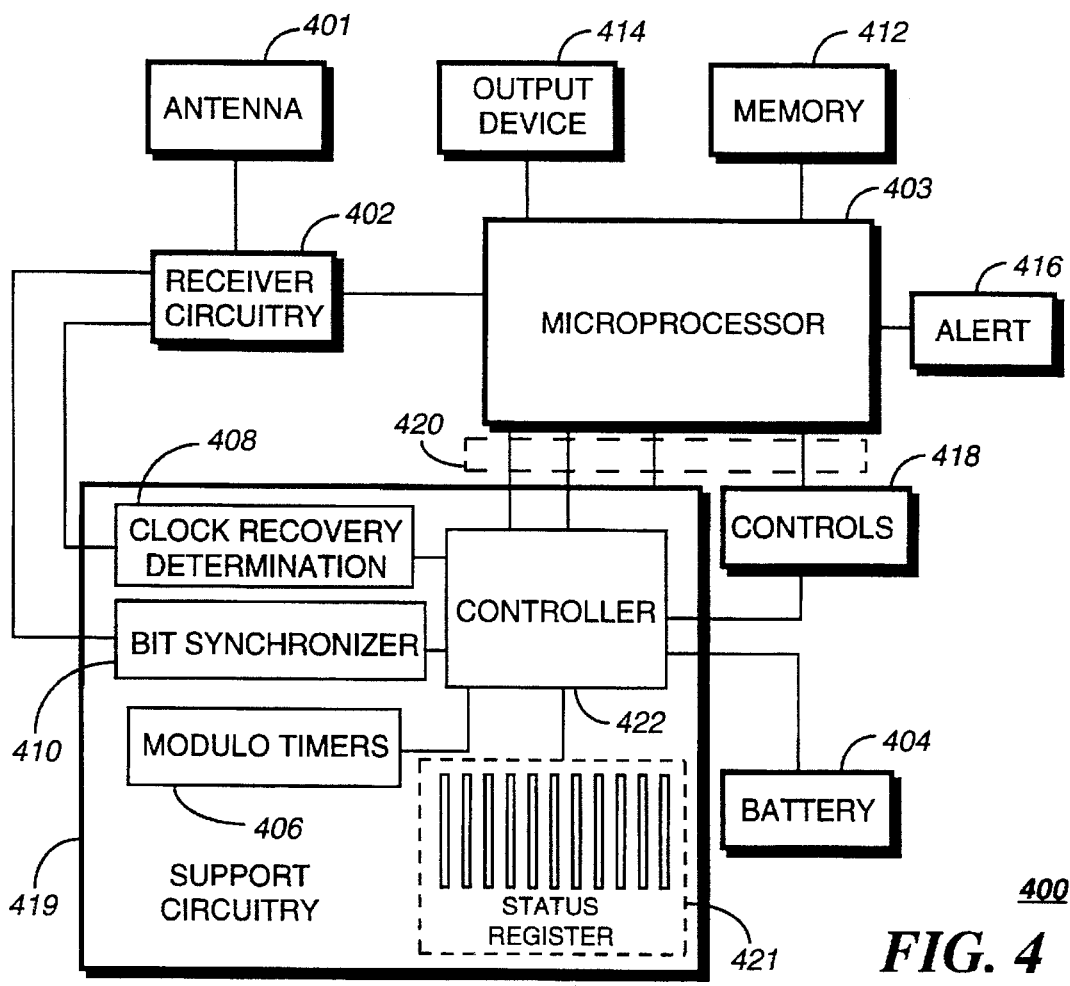
FIG. 4 is a block diagram of a selective call receiver in accordance with a preferred embodiment of the present invention.

Referring next to FIG. 4, a selective call receiver 400, such as a pager, comprises an antenna 401 that receives a radio frequency (RF) modulated selective call signal and provides the signal to receiver circuitry 402 for demodulation thereby. A microprocessor 403 processes the demodulated signal to decode an address and optional message data contained therein. The recovered message may be stored in a memory 412 for subsequent presentation by an output device 414, such as a liquid crystal display or an audio transducer. In operation, the microprocessor 403 compares a decoded address contained in the signal with predetermined addresses. The user is alerted by an alert mechanism 416 that a message has been received if the decoded address correlates with one of the predetermined addresses. If the signal contains optional message data, the output device 414 will present the message automatically or when manually selected by user actuated controls 418.

Support circuitry 419 coupled to the receiver circuitry 402, the microprocessor 403, a battery 404 and the user actuated controls 418 provides supporting circuitry for operation of the selective call receiver 400. In accordance with the present invention, the support circuitry 419 and the microprocessor 403 have the relationship of a slave device and a master device (see FIG. 1) and are coupled by a serial peripheral interface (SPI) 420. A controller 422 internal to the support circuitry 419 receives signals from both internal interrupt sources and external interrupt sources, such as the battery 404 and the user actuated controls 418.

The internal interrupt sources are, for example, modulo timers 406 which count down from a predetermined number, clock recovery determination circuitry 408 which detects the baud rate of the RF modulated selective call signal, and a bit synchronizer 410 which maintains synchronization to the demodulated signal. Upon reception of a signal from an interrupt source, the controller 422 pulls an interrupt line 424 low to initiate communication with the microprocessor 403. The battery 404 could provide interrupt sources such as "low power" when the battery power is depleted below a minimum threshold or "gone cell" when the battery cell is removed from the selective call receiver 400. The user actuated controls 418 could comprise one or more user actuated buttons, and an interrupt source would be provided from the activation of each of the buttons.

Information about the various interrupt sources, both internal and external, is contained in a plurality of interrupt status registers 421 internal to the support circuitry 419 and coupled to the controller 422, which updates the information in response to signals received from the interrupt sources.

Figure 5:
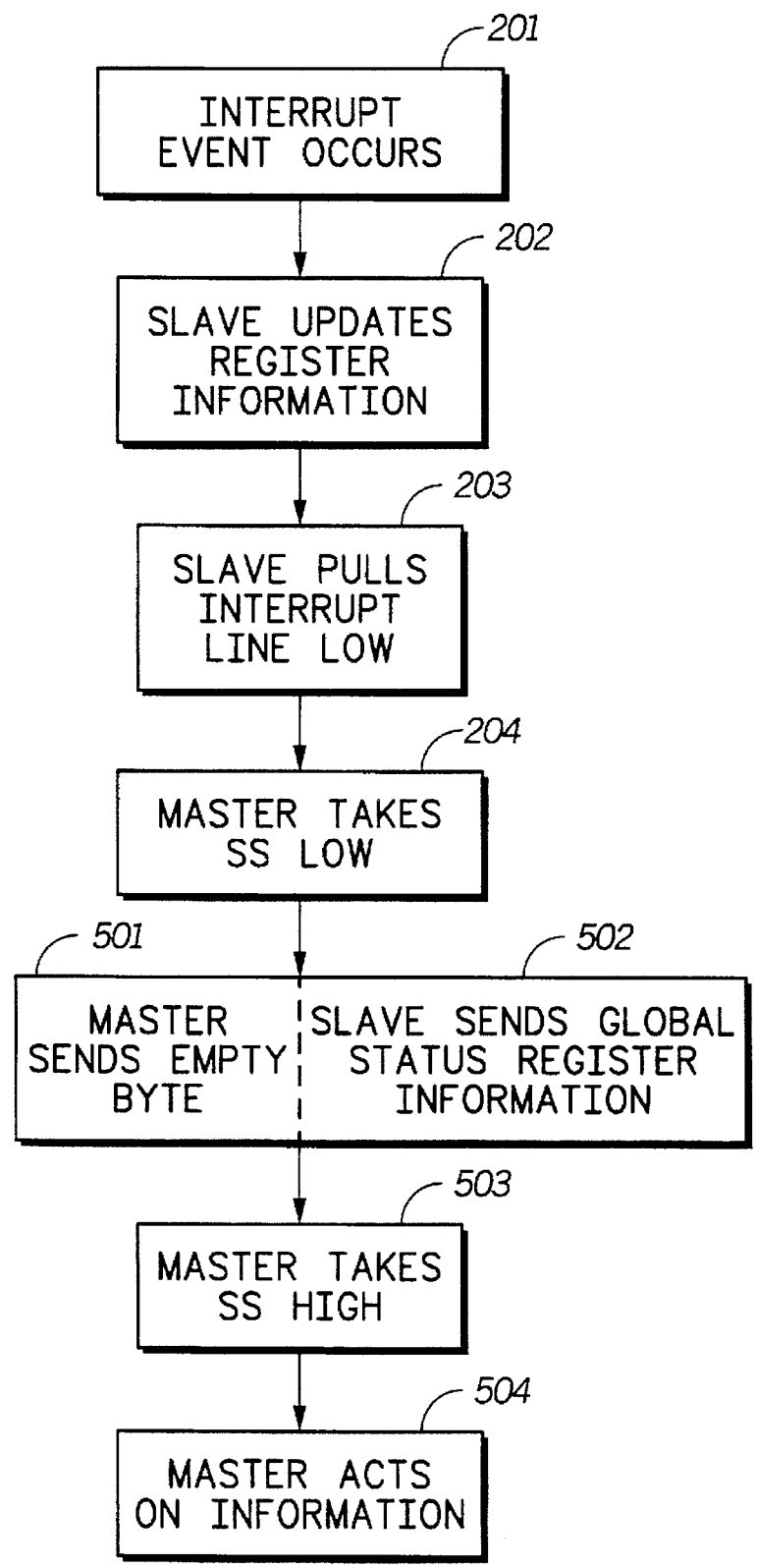
FIG. 5 is a flowchart illustrating a method of data transference in accordance with a preferred embodiment of the present invention.

Referring to FIG. 5, when an interrupt event occurs 201, the support circuitry 419 updates 202 the information contained in the interrupt status registers 421. The support circuitry 419 pulls the interrupt line 424 low 203 to inform the microprocessor 403, acting as a master device, that data is ready to be transferred. The microprocessor then initiates communication by taking the SS line of the SPI 420 low 204.

Conventionally, as seen in FIG. 2, the master device, after initiating communication, requests specific interrupt information by sending 205 the address of a particular status register to the slave device. In accordance with the present invention, however, the microprocessor 403 sends 501 an empty byte, i.e., one that contains no useful information, to the support circuitry 419 at the first falling edge of the SCK line of the SPI 420 clock cycle. Rather than waiting for the master device to identify 205 (FIG. 2) the address of the particular interrupt status register, the support circuitry 419 automatically sends 502 a first byte of data, hereafter referred to as a global status register, over the MISO line of the SPI 420 at the first falling edge of the SCK line clock cycle. The global status register comprises selected information from the interrupt status registers 421 about all of the various interrupt sources and can be sent by the slave device whether the SPI 420 is in a read or a write mode. Conventionally, the slave device could only send data to the master device if the SPI 420 was in a read mode.

Subsequent to receiving the global status register information, the microprocessor 403 takes the SS line of the SPI 420 high 503, ending communication with the support circuitry 419. The microprocessor 403 then proceeds to act 504 upon the information received. As can be seen by referring back to prior art FIG. 2, steps 205, 206, and 207 of the prior art have been removed from the communication process of the present invention. The master device is advantageously able to respond to information received from the slave device more quickly because the slave device immediately sends 502 the interrupt information contained in the global status register to the master device rather than waiting for a request for information from the master device. The master device receives the interrupt information on which to act from within the global status register information.

Figure 6:
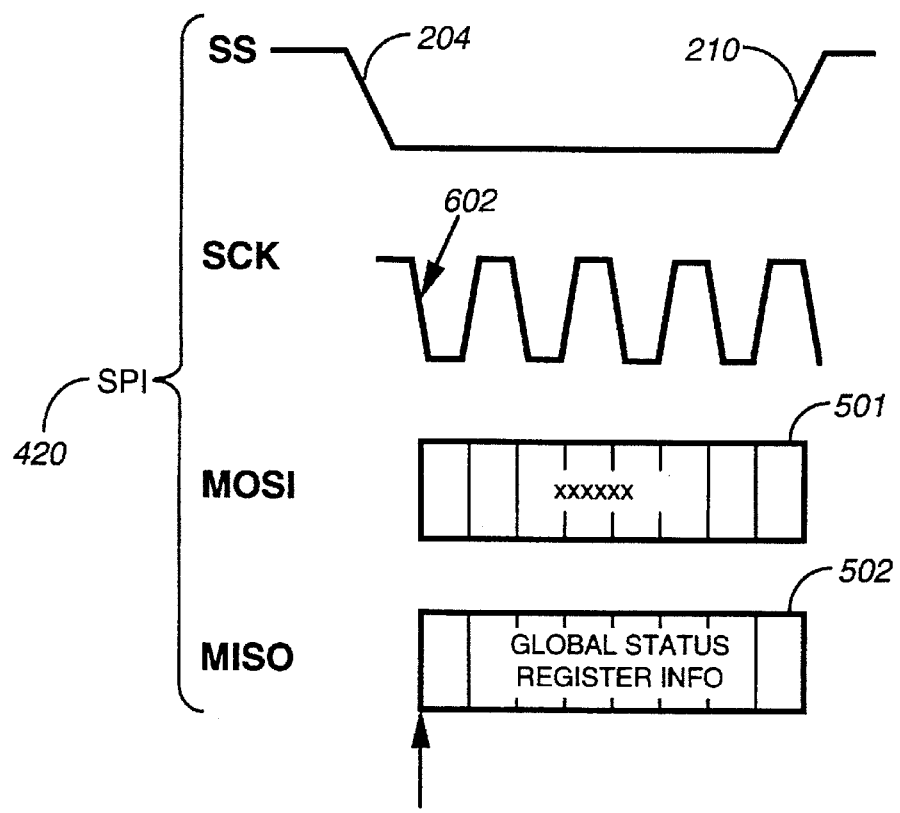
FIG. 6 is a timing diagram of the method of data transference of FIG. 5 in accordance with a preferred embodiment of the present invention.

Referring to FIG. 6, a timing diagram illustrates the process of communication in the preferred embodiment of the present invention. After the microprocessor 403 takes 204 the SS line of the SPI 420 low, data transference begins on the first falling edge 602 of the SCK line clock cycle. The microprocessor 403 then sends 501 an empty byte on the MOSI line of the SPI 420, while the support circuitry 419 sends 502 the interrupt information in the form of the global status register on the MISO line of the SPI 420. Communication could be ended after only eight cycles, rather than the conventional sixteen cycles, of the clock because, during the first eight clock cycles, the support circuitry 419 sends 502 the interrupt information contained in the global status register to the microprocessor 403. Prior art FIG. 3 illustrates a conventional communication process requiring sixteen clock cycles wherein conventional data transference of interrupt information requires twice the time of that required in accordance with the present invention.

The use of the global status register allows selected information about all of the various interrupt sources to be transferred in the first byte of data, which is normally not used to transfer any useful information. When an interrupt source instructs the slave device to generate an interrupt signal, in accordance with the present invention, a master device receives the information in the first byte of data, thereby eliminating the need for provision of an additional second byte to complete the data transference. In the case of a critical event, e.g., loss of power from the main battery, the master device would be able to respond more rapidly to correct any problems indicated by interrupt information communicated by the slave device.

By now it should be appreciated that there has been provided a more rapid method of data transference between a master device and a slave device.

We claim:

1. A method for data transference between a master device and a slave device included in an electronic device and coupled by a serial peripheral interface (SPI), comprising the steps of:

the master device providing a communication initiation signal to the slave device over the SPI, wherein the communication initiation signal addresses no registers within the slave device; and the slave device, responsive to the communication initiation signs, automatically providing status information from a status register to the master device over the SPI without having first received from the master device an address of the status register in which the status information is stored by the slave device.

2. The method of claim 1, wherein the step of the slave device providing the status information comprises the step of the slave device providing the status information to the master device over the SPI during the first clock cycle following transmission of the communication initiation signal.

3. The method of claim 1, further comprising, prior to the step of the slave device providing the status information, the steps of:

the slave device monitoring sources of events in the electronic device; and the slave device updating the status register with the status information in response to occurrence of the events.

4. A method for full duplex data transference between a master device and a slave device included in an electronic device and coupled by a serial peripheral interface (SPI), comprising the steps of:

the slave device updating register information in a status register in response to an event occurring within the electronic device;

the master device providing, over the SPI, a communication initiation signal to the slave device subsequent to the updating step, wherein the communication initiation signal addresses no registers within the slave device;

the slave device, responsive to the communication initiation signal, automatically providing, during the first clock cycle following transmission of the communication initiation signal, a portion of the updated register information from the status register over the SPI to the master device without having first received from the master device an address of the status register in which the updated register information is stored.

5. The method in accordance with claim 4, further comprising the step of:

the master device, substantially coincident with transmission of the portion of the updated register information by the slave device, providing to the slave device meaningless information that does not request specific interrupt information, that does not address the status register, and to which the slave device does not respond.

6. The method in accordance with claim 5, further comprising the step of:

the master device responding, subsequent to receiving the portion of the register information, to the portion of the register information provided by the slave device.

7. The method in accordance with claim 4, further comprising the step of:

the slave device, prior to receiving the communication initiation signal from the master device, requesting communication with the master device over the SPI.

8. The method in accordance with claim 4, wherein:

the step of the master device providing the communication initiation signal comprises the step of the master device taking a slave select line of the SPI low; and the step of the slave device providing the portion of the updated register information comprises the step of transmitting the updated register information over a master-in-slave-out line of the SPI.

9. The method in accordance with claim 4, wherein the step of the slave device updating register information comprises the steps of:

the slave device monitoring sources of events occurring in the electronic device; and the slave device storing status information about the events as the updated register information in the status register.

10. In a selective call receiver, a method for full duplex data transference between a microprocessor and a slave device included within the selective call receiver and coupled by a serial peripheral interface (SPI), the method comprising the steps of:

the slave device monitoring sources of events in the selective call receiver;

the slave device updating status information contained in a status register in response to at least one of the events occurring within the selective call receiver;

the slave device providing an interrupt signal to the microprocessor over the SPI in response to updating the status information;

the microprocessor, in response to the interrupt signal, providing a communication initiation signal to the slave device over the SPI, wherein the communication initiation signal addresses no registers of the slave device; and the slave device, in response to the communication initiation signal and during the first clock cycle following transmission of the communication initiation signal, automatically providing a portion of the status information contained in the status register to the microprocessor over the SPI without first receiving an address of the status register from the microprocessor.

11. The method in accordance with claim 10, further comprising the step of:

the microprocessor providing to the slave device meaningless information to which the slave device does not respond, wherein the meaningless information is provided over the SPI during the first clock cycle following transmission of the communication initiation signal.

12. The method in accordance with claim 10, wherein:

the step of the microprocessor providing the communication initiation signal comprises the step of the microprocessor taking a slave select line of the SPI low; and the step of the slave device providing the portion of the status information includes the step of the slave device providing the portion of the status information over a master-in-slave-out line of the SPI.

13. An electronic device having full duplex data transference between semiconductor devices, comprising:

a master device for providing to a slave device a communication initiation signal that addresses no registers included in the slave device;

a serial peripheral interface (SPI) for coupling the master device to the slave device to provide the communication initiation signal thereover; and the slave device, comprising:
 means for receiving information signals from sources;
 a status register for storing information;
 means for updating the information stored in the status register in response to the information signals; and
 means for automatically providing the updated information to the master device over the SPI in response to the communication initiation signal without first receiving an address of the status register from the master device, wherein the updated information is provided by the slave device during the first clock cycle following the communication initiation signal.

14. The electronic device in accordance with claim 13, wherein the SPI further comprises a clock signal line for controlling data transference such that data transference between the master device and the slave device begins on a first falling edge of the clock signal after the communication initiation signal has been provided.

15. The electronic device in accordance with claim 13, wherein the master device comprises means for transmitting, over the SPI and at substantially the same time as the slave device provides the updated information over the SPI, meaningless information that does not address the status register and to which the slave device does not respond.

16. The electronic device in accordance with claim 15, wherein the SPI includes:

a slave select line that is taken low by the master device to provide the communication initiation signal;

a master-in-slave-out line for transferring the updated information to the master device; and a master-out-slave-in line for transferring the meaningless information to the slave device.

17. A selective call receiver having full duplex data communication between semiconductor devices, comprising:

a microprocessor for providing a communication initiation signal that addresses no registers included in any other device of the selective call receiver;

a support chip coupled to the microprocessor for receiving the communication initiation signal, for receiving interrupt signals from interrupt sources, for storing interrupt information corresponding to the interrupt signals in a register, and for automatically providing, in response to the communication initiation signal, portion of the interrupt information included in the register to the microprocessor without first receiving an address of the register from the microprocessor; and a serial peripheral interface (SPI) coupled between the microprocessor and the support chip for providing the communication initiation signal from the microprocessor to the support chip, for transferring the interrupt information from the support chip to the microprocessor, and for providing to the support chip, as a function of full duplex data transference between the support chip and the microprocessor, meaningless information to which the support chip does not respond, wherein the meaningless information does not address the register, and wherein the transference of both the meaningless information and the interrupt information occurs during the first clock cycle following the communication initiation signal.

* * * * *

UNITED STATES PATENT AND TRADEMARK OFFICE
CERTIFICATE OF CORRECTION

PATENT NO. : 5,630,152
DATED : May 13, 1997
INVENTOR(S) : DeLuca et al.

It is certified that error appears in the above-identified patent and that said Letters Patent is hereby corrected as shown below:

Column 5, line 46, change "signs" to --signal--.

Signed and Sealed this

Fourteenth Day of December, 1999

Attest:

Q. TODD DICKINSON

*Attesting Officer*   *Acting Commissioner of Patents and Trademarks*